G. H. PALLADY.
MACHINE FOR HARVESTING BROOM CORN AND THE LIKE.
APPLICATION FILED FEB. 6, 1913.
1,116,107.
Patented Nov. 3, 1914.
2 SHEETS—SHEET 1.
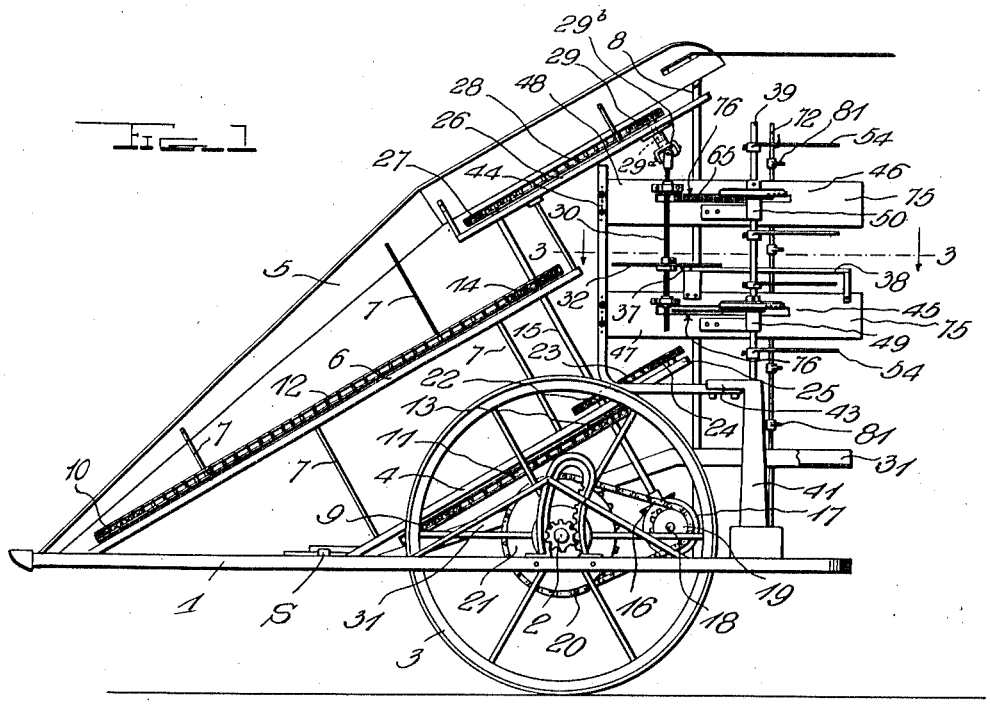
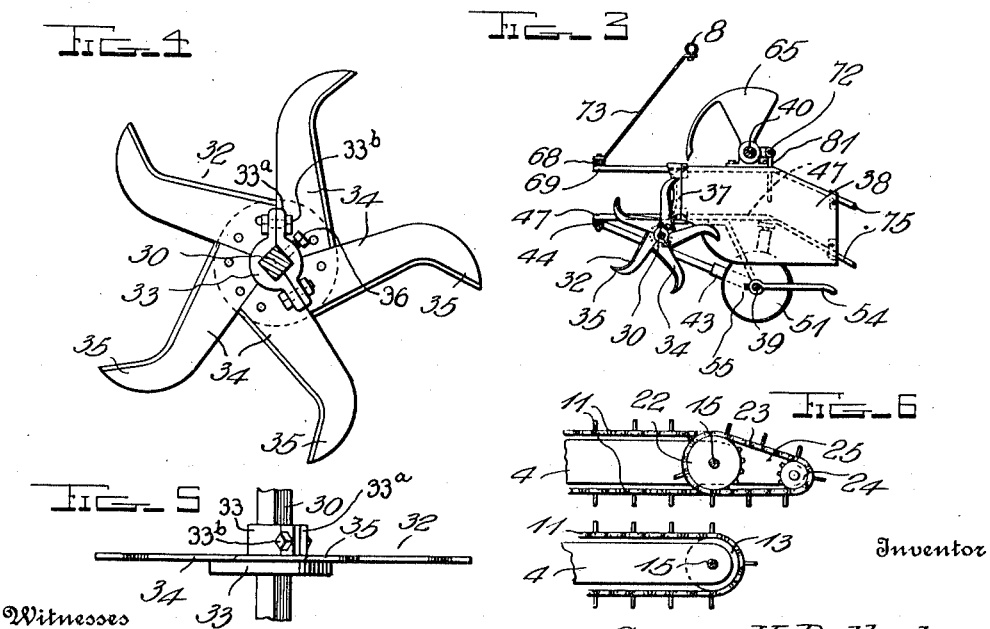
Witnesses
Inventor
George H. Pallady
By
H. B. Willson & Co. Attorneys

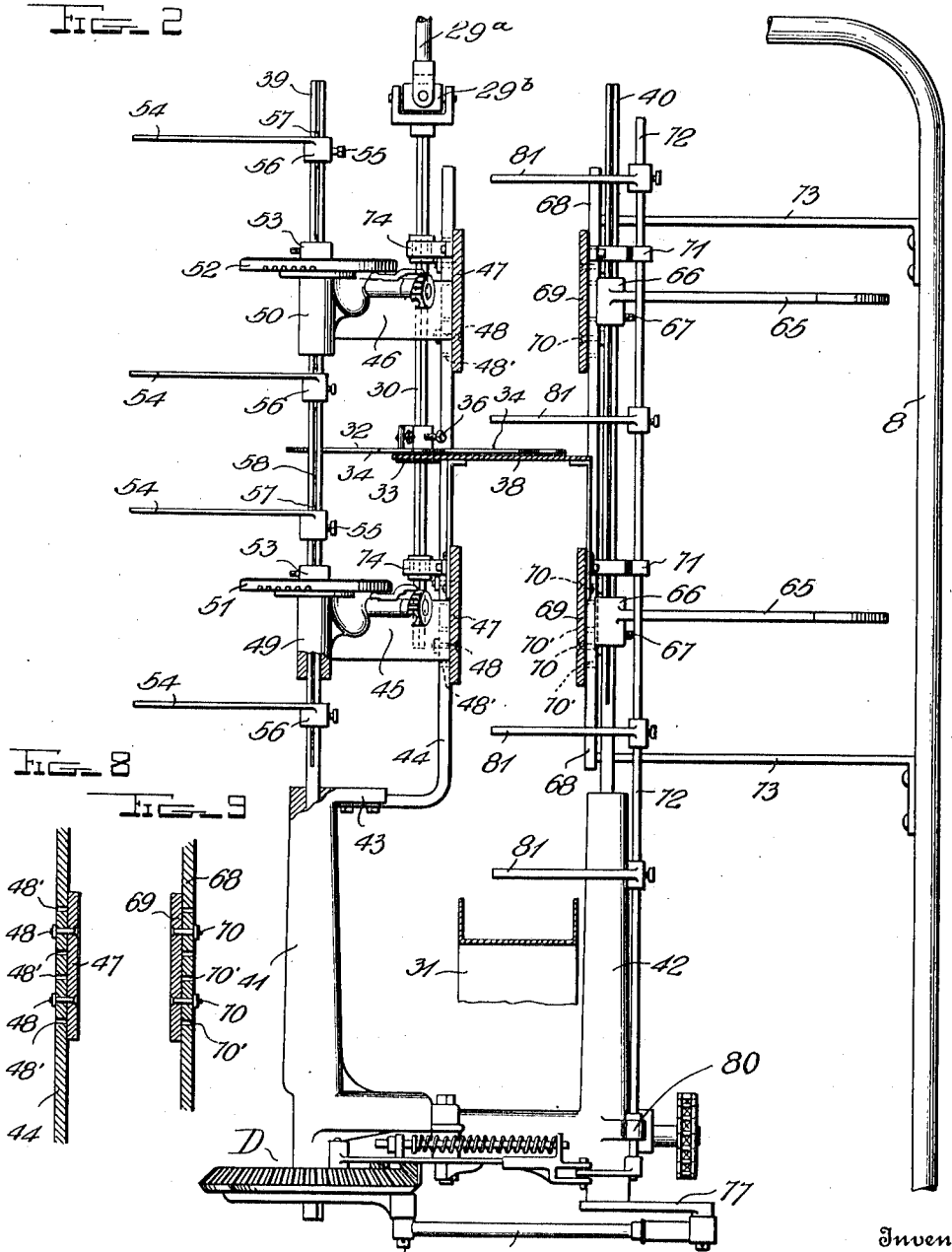

UNITED STATES PATENT OFFICE.

GEORGE H. PALLADY, OF ALLERTON, IOWA.

MACHINE FOR HARVESTING BROOM-CORN AND THE LIKE.

1,116,107.  Specification of Letters Patent.  Patented Nov. 3, 1914.

Application filed February 6, 1913. Serial No. 746,610.

*To all whom it may concern:*

Be it known that I, GEORGE H. PALLADY, a citizen of the United States, residing at Allerton, in the county of Wayne and State of Iowa, have invented certain new and useful Improvements in Machines for Harvesting Broom-Corn and the like; and I do declare the following to be a full, clear, and exact description of the invention, such as will enable others skilled in the art to which it appertains to make and use the same.

This invention relates to improvements in harvesting machines and particularly to machines for harvesting broom corn and the like.

One object of the invention is to provide a machine of this character having a plurality of sickles and a plurality of bundle binding devices whereby the stalks may be cut into a plurality of sections and said cut sections bound into separate bundles or whereby the stalks may be cut once and then formed into bundles which may be tied at one or more places.

Another object is to provide a harvester of the character described having two sickles one of which is adjustable and having two sets of binding devices which are adjustable with respect to the sickles, thereby permitting the stalks to be cut and the bundles to be bound at any desired point and which is further provided with an adjustable deck for supporting the upper severed sections of the stalks while being bound and until discharged from the machine.

With these and other objects in view, the invention consists of certain novel features of construction, and the combination and arrangement of parts as will be more fully described and claimed.

In the accompanying drawings, Figure 1 is a side view of a broom corn harvesting machine embodying my improvements; Fig. 2 is an enlarged rear view of the adjustable sickle and bundle binding devices and their supporting and operating mechanism, parts being broken away and in section; Fig. 3 is a horizontal section taken on the line 3—3 of Fig. 1; Fig. 4 is a plan view of the adjustable sickle; Fig. 5 is a side view thereof; Fig. 6 is a plan view of the rear end of one set of stalk conveying chains, showing one of the same provided with a supplemental chain which forms an extension for conveying the stalks beyond the main conveying chains; Fig. 7 is a detail side view partly in section of the supporting shaft for the bundle discharging arms, showing the manner in which the latter are adjustably secured to the shafts; Figs. 8 and 9 are detail vertical sectional views of a portion of the standards which support the binding mechanism showing more clearly the manner in which this mechanism is adjustably secured to the standards.

Referring more particularly to the drawings, 1 denotes the main supporting frame of my improved harvester, said frame being adjustably mounted on the axle 2 of supporting wheels 3 in the usual or any approved manner whereby the harvesting mechanism is supported at any desired elevation. Secured at their forward ends to the outer ends of the main frame 1 are lower, upper and intermediate series of stalk guiding arms and decks 4 and 5 and 6, which extend rearwardly and upwardly at a suitable inclination and are spaced apart and held in proper relative position by a series of brace bars 7 arranged between the same as shown. The rear ends of the upper stalk guiding arms 5 are secured to and supported by the upper ends of frame standards 8.

Revolubly mounted on the forward ends of the lower stalk guiding arms are sprocket gears 9, similar gears 10 being revolubly mounted on the forward ends of the intermediate stalk guiding arms. With the gears 9 and 10 are respectively engaged the forward ends of stalk conveying chains 11 and 12 the upper ends of which are respectively engaged with sprocket gears 13 and 14 which are fixedly mounted on drive shafts 15 arranged at right angles to the arms or decks 4 and 6 and revolubly mounted therein. The shafts 15 have fixed on their lower ends bevel gears 16 which engage and are driven by similar gears 17 mounted on a main drive shaft 18 which is geared to the axle of the machine in any suitable manner, said shaft being here shown as having fixed thereon a sprocket gear 19 which is connected by a sprocket chain 20 with a sprocket gear 21 fixed on the axle of the machine.

On one of the shafts 15 immediately above the sprocket gear 13 is a similar sprocket gear 22 with which is engaged a sprocket chain 23, said chain being engaged at its opposite end with a sprocket pinion 24 revolubly mounted on an extension 25 of one of the arms or decks 4. The supplemental chain 23 provides an extension for the rear end of the adjacent stalk conveying chain 11 whereby the stalks after being conveyed to the limit of the chains 11 are further projected or conveyed to a position where they will be positively engaged by the additional or supplemental cutting mechanism hereinafter described. The supplemental conveyer chain 23 when arranged as shown and described takes the place of the usual packer arms of the harvester and forms an effectual means in connection with other parts hereinafter described for feeding and packing the stalks into bundles to be bound by the binding mechanism of the harvester.

The shafts 15 are extended above the sprocket gears 14 on the rear ends of the decks 6 and have their upper ends mounted in upper rear chain supporting decks 26 which are arranged below the inner or rear ends of the inclined stalk guiding arms or decks 5. On the upper ends of the shafts 15 above the decks 26 are fixedly mounted sprocket gears 27 with which are engaged stalk conveying chains 28 the rear ends of which are engaged with sprocket gears 29. The shafts of these gears are revolubly mounted on the rear ends of the decks 26 as shown. The shaft of one of the gears 29 extends downwardly and forms a stud shaft 29$^a$ below the deck 26 and has a universal joint connection 29$^b$ with a supplemental sickle supporting and operating shaft 30 which will be hereinafter more fully described.

Suitably mounted in the frame 1 at the forward ends of the lower stalk guiding arms or decks 4 is a main sickle or cutting mechanism S which may be of the usual or any approved construction and which cuts the standing stalks as they are guided and conveyed back to this cutting mechanism by the upper and intermediate guiding arms and decks. The standing stalks after thus being cut are fed upon the forward end of an upwardly and rearwardly inclined stalk supporting chute or deck 31 up which the stalks are fed by the conveyer chains to the supplemental cutting mechanism and to the main and supplemental binding mechanism of the harvester.

The supplemental stalk cutting mechanism hereinbefore referred to and which is provided to cut off the tops or heads of the stalks or to cut the latter into sections after the same have been severed by the main cutting mechanism S comprises a horizontally disposed sickle 32 having a flanged hub 33 to which is secured a series of radially projecting blades 34 which are riveted at their inner ends to the flange of the hub 33 as clearly shown in Fig. 4 of the drawings and which are provided with curved or hook shaped outer ends 35. The flanged hub of the sickle is preferably formed in separate sections, each of which has formed thereon apertured lugs 33$^a$ with which are engaged clamping bolts 33$^b$ whereby the sections of the hub are clamped into engagement with the shaft 30 and may be readily disengaged therefrom to permit the removal of the sickle when desired, without disturbing any of the other parts of the machine. The hub 33 of the sickle has a sliding adjustable engagement with the shaft 30 and may be keyed thereto or as herein shown the shaft may be square and the hub provided with a square aperture to receive the shaft whereby the sickle is prevented from turning on the shaft but has a sliding engagement therewith and is held in its adjusted positions thereon by a set screw 36 or other suitable fastening means. The shaft 30 is revolubly mounted in suitable bearings on a part of the supporting frame of the bundle binding mechanism hereinafter described and said shaft is driven by the stud shaft 29$^a$ of one of the gears 29 of the upper stalk conveying chains through the flexible or universal joint connection 29$^b$ between these shafts. The rotary sickle 32 co-acts with a stationary cutting blade 37 fixed on the inner end of a supplemental stalk supporting deck or chute 38 which is adjustably and removably supported on the rear portion of the machine in a manner hereinafter described. The cutting edge of the stationary blade 37 is preferably curved and the curved ends of the sickle blades co-act with this curved edge of the stationary blade, thus producing a wiping or shearing cut on the stalks engaged between said blades and as clearly indicated in Fig. 3 of the drawings. The tops of the stalks after being cut by the supplemental cutting mechanim just described pass onto the chute or deck 38 on which they are supported while being formed and bound into bundles, the lower sections of the stalks being supported on the lower or main chute or deck 31 while said lower sections are being formed in bundles and bound by the lower or main binding mechanism.

The bundle forming and binding mechanism comprises vertically disposed shafts 39 and 40 which are arranged in the rear portion of the machine and are revolubly mounted in elongated bearing sleeves 41 and 42 fixed on or forming part of the supporting frame of the machine. Secured at its lower end to a right angularly formed bracket 43 is an upwardly extending supporting bar or standard 44 which is spaced a suitable distance from the shaft 39 and is parallel therewith as shown. Adjustably mounted on the bar or standard 44 is a lower main knot tying mechanism 45 and an upper supplemental knot tying mechanism 46, said mechanisms being secured to supporting and guiding boards or plates 47 which are adjustably secured to the standard 44 by bolts 48 which are engaged with series of bolt holes 48′ formed in the standards as shown. The knot tying mechanisms 45 and 46 may be of the usual or any approved construction but are preferably the same as those employed in the well known McCormick corn harvester, such for instance as shown in U. S. Patent No. 697,750, granted April 15, 1902, to J. W. Pridmore. The knot tying mechanisms are also adjustably supported by sleeves 49 and 50 which have a sliding engagement with the shaft 39 as shown. Adjustably mounted on and keyed to the shaft 39 are the operating gears 51 and 52 for the knot tying devices 45 and 46, said gears 51 and 52 being held in operative engagement with their respective knot tying devices by integral collars 53 which are secured to the shaft 39 and rigidly held by set screws or other fastening devices. By thus arranging the gears 51 and 52 it will be seen that when the shaft 39 is driven the gears 51 and 52 will also be driven and will actuate the knot tying devices. Also adjustably keyed to the shaft 39 above and below the knot tying devices are bundle discharging arms 54, said arms being adjustably secured to the shafts by set screws 55 which are engaged with collars 56 on the inner ends of the arms, said collars having applied thereto keys 57 which are slidably engaged with a key-way or longitudinal groove 58 in the shaft 39 as clearly shown in Fig. 7 of the drawings. When thus arranged and mounted on the shaft 39 it will be seen that the bundle discharging arms 54 will be operated by said shaft at the proper time for discharging the bundles from the machine after the same have been bound and tied by the knot tying devices hereinbefore described.

The shaft 39 is operated periodically or intermittently by a driving mechanism D which may be of any approved construction but is preferably the same as the operating mechanism for the bundle binding mechanism of the McCormick corn harvesters, such for instance as that shown in U. S. Patent No. 601,609, granted March 29, 1898, to H. E. Pridmore. This operating mechanism is connected to the main driving mechanism of the harvester and will drive the shaft 39 at the proper time for operating the tying mechanism when the stalks have accumulated in sufficient numbers for forming a bundle of the desired size which after being tied or bound is discharged from the machine by the arms 54, said arms by this time having been brought around into engagement with the bound bundles.

Slidably keyed and adjustably secured to the shaft 40 are twine carrying needles 65 disposed opposite to the knot tying mechanisms of the supporting bar 44 and shaft 39 and with which said needles cooperate or to which the needles carry the twine which is fastened by the tying or knotting mechanism, thus binding the stalks into bundles. The needles 65 may be of the usual or any approved construction and are secured at their inner ends to sleeves 66 which are slidably keyed to the shaft 40 and are held in position thereon by set screws 67. Spaced a suitable distance from the shaft 40 and disposed in line with or opposite to the supporting standard 44 is a second vertically disposed supporting standard 68 to which are adjustably secured supporting and guiding plates or boards 69, said boards being adjustably secured to the standard 68 by bolts 70 which are adapted to be engaged with series of bolt holes 70′ in the same manner as the bolts which secure the guiding and supporting boards 47. The boards or plates 69 have secured to their outer sides guide brackets 71 with which the needle supporting and operating shaft 40 is revolubly engaged and which also support the shaft 72 of a stalk retaining mechanism hereinafter described. The standard 68 is suitably braced and firmly supported by brace bars 73 which are connected thereto and to the main upright or standard 8 of the frame as shown. The boards or plates 47 of the standard 44 have secured to their outer sides guiding brackets 74 with which the sickle operating shaft 30 is revolubly engaged and held in position. The rear ends of the boards or plates 47 and 69 have secured thereto rearwardly extending stalk guiding plates 75 which preferably extend at an angle toward one side of the rear end of the machine as shown. The boards or plates 69 have formed therein suitable slots 76 through which the needles 65 on the shaft 40 are adapted to operate. The shaft 40 which operates the needles 65 is provided on its lower end with a crank arm 77 which is connected by a pitman rod 78 to a crank pin 79 in the gear which drives the shaft 39 of the knot tying mechanism.

By connecting the shaft 40 in the manner described, it will be seen that said shaft will be operated simultaneously with the shaft 39 and by the same driving mechanism which operates the latter shaft, so that the needles 65 will bring the twine into engagement with the knot tying mechanism at the proper time to be tied by the latter.

The stalk retaining mechanism herein referred to comprises the shaft 72 which is revolubly mounted in the brackets 71 on the boards 69 and which is further revolubly supported in the guiding and supporting bracket 80 formed on the lower portion of the bearing sleeve 42. Adjustably mounted on the shaft 72 at suitable positions above the main and supplemental stalk supporting decks are a series of right angular inwardly projecting stalk retaining arms 81 which extend across the path of movement of sections of the stalks which are being forced back on their respective decks and which hold the stalks in position on the decks until a sufficient number of stalks have accumulated for forming a bundle of the desired size at which time the shaft 72 will be automatically operated through a suitable connection with the operating mechanism of the shaft 39 to swing the stalk retaining arms back or out of the path of movement of the stalks thereby permitting the discharging arms 54 to discharge the bound bundles from the machine. The stalk retaining arms 81 may be held in position to stop or retain the stalks forced against the same by and are actuated to release the bound bundles by any suitable operating mechanism, such as that employed in McCormick corn harvesters and which is shown in the previously mentioned Patent No. 601,609, granted March 29, 1898, to H. E. Pridmore, and which as well as the operating mechanism for the shafts 39 and 40 forms no part of the present invention and may be of any suitable construction for properly driving the parts operated thereby in the manner described, it being understood that the essential features of this application are embodied in the adjustable and removable supplemental sickle for cutting the stalks into sections or severing the heads or tops therefrom and which acts in conjunction with the main cutting mechanism of the stalks whereby they are cut and re-cut by the same machine and in the double adjustable binding mechanism whereby the separate sections of the stalks or the main portion and tops thereof are independently formed and bound into bundles and whereby when the supplemental sickle is removed the stalks may be tied or bound at two points. It will be further understood that while the machine is primarily intended for harvesting broom corn, Kafir corn, cane and the like, from which the heads are severed it is obvious that the machine may be employed for harvesting any kind of corn or grain.

From the foregoing description taken in connection with the accompanying drawings, the construction and operation of the invention will be readily understood without requiring a more extended explanation.

Various changes in the form, proportion and the minor details of construction may be resorted to without departing from the principles or sacrificing any of the advantages of the invention as claimed.

Having thus described my invention, what I claim is:

1. In a corn harvesting machine, a main cutting mechanism for severing the standing stalks, an adjustable and removable supplemental cutting mechanism disposed in rear of and above the main cutting mechanism and adapted to cut the severed stalks into sections, a main binding mechanism in a plane below the supplemental cutting mechanism, and a supplemental binding mechanism removably mounted in a plane above said supplemental cutting mechanism, all as and for the purpose set forth.

2. In a corn harvesting machine, the combination with the main framework, the main cutting mechanism and its deck, a pair of spaced standards, and a supplemental deck adjustably mounted thereon; of a supplemental cutting mechanism disposed above said supplemental deck, parallel pairs of boards adjustably mounted on said standards above and below said supplemental cutting mechanism, each board being horizontally slotted, upright sleeves carried by the framework, upright shafts mounted at their lower ends in said sleeves and driven in timed relation with each other, main and supplemental sets of discharge arms carried by one shaft, main and supplemental needles carried by the other shaft and operating through the slots in said boards, another upright shaft, retaining arms mounted thereon and disposed in pairs above each deck, and means for permitting the adjustment of the discharge arms, retaining arms, and needles.

3. In a grain binder, in combination, a plurality of knotting devices spaced apart, and means for severing the stalks between them.

4. In a grain binder, in combination, a plurality of axially alined knotting devices spaced apart, and means for severing the stalks between them.

5. In a grain binder, in combination, a plurality of knotting devices spaced apart, and a knife moving in an orbital path and operating between said knotters in a manner to sever the stalks.

6. In a grain binder, in combination, a plurality of axially alined knotting devices spaced apart, and means for severing the stalks between them in advance of said devices.

7. A grain binder having, in combination, a plurality of axially alined knotting devices spaced apart, and a knife moving in an orbital path located in advance of said knotting devices and adapted to sever the stalks between them.

8. In a grain binder, in combination, a plurality of knotting devices spaced apart, a knife moving in an orbital path, and a fixed knife coöperating therewith in a manner to sever the stalks between said knotting devices.

9. In a grain binder, in combination, a plurality of axially alined knotting devices spaced apart, a knife moving in an orbital path, and a fixed knife coöperating therewith in a manner to sever the stalks between said knotting devices.

10. In a grain binder, in combination, a plurality of axially alined knotting devices spaced apart, a knife moving in an orbital path, and a fixed knife coöperating therewith in a manner to sever the stalks between said knotting devices and in advance of said knotting devices.

In testimony whereof I have hereunto set my hand in presence of two subscribing witnesses.

GEORGE H. PALLADY.

Witnesses:
L. O. HILTON,
M. H. STUARD.